United States Patent
Huang et al.

(10) Patent No.: US 11,708,882 B2
(45) Date of Patent: Jul. 25, 2023

(54) HEAD MECHANISM AND ROBOT

(71) Applicant: UBTECH ROBOTICS CORP LTD, Shenzhen (CN)

(72) Inventors: Liang Huang, Shenzhen (CN); Hongyu Ding, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 208 days.

(21) Appl. No.: 16/941,579

(22) Filed: Jul. 29, 2020

(65) Prior Publication Data
US 2021/0199183 A1 Jul. 1, 2021

(30) Foreign Application Priority Data
Dec. 30, 2019 (CN) .......................... 201922490424.1

(51) Int. Cl.
*F16H 21/54* (2006.01)
*B25J 17/00* (2006.01)
*B25J 9/12* (2006.01)
*B25J 17/02* (2006.01)
*B25J 9/10* (2006.01)

(52) U.S. Cl.
CPC .............. *F16H 21/54* (2013.01); *B25J 9/126* (2013.01); *B25J 17/00* (2013.01); *B25J 17/0266* (2013.01); *B25J 9/106* (2013.01)

(58) Field of Classification Search
CPC ....... F16H 21/54; B25J 17/00; B25J 17/0266; B25J 9/106

USPC ....................................................... 74/490.06
See application file for complete search history.

(56) References Cited

U.S. PATENT DOCUMENTS

| 4,584,896 A * | 4/1986 | Letovsky | B25J 9/04 434/57 |
| 2009/0282944 A1* | 11/2009 | Kim | B25J 18/00 74/490.05 |

FOREIGN PATENT DOCUMENTS

| CN | 101537621 A | * | 9/2009 | |
| CN | 103273493 A | | 9/2013 | |
| CN | 103831828 A | * | 6/2014 | |
| CN | 107030728 A | * | 8/2017 | ......... B25J 17/0283 |
| CN | 209007541 U | * | 6/2019 | |
| EP | 2733408 A1 | * | 5/2014 | ......... B25J 11/0015 |
| JP | 2007160482 A | * | 6/2007 | |
| KR | 20090118542 A | * | 11/2009 | |

* cited by examiner

*Primary Examiner* — T. Scott Fix

(57) ABSTRACT

A head mechanism includes a base connectable to a body of a robot, a mounting member arranged above the base, a connecting member rotatably connected to the base and the mounting member. The connecting member, together with the mounting member, is rotatable relative to the base about a first axis, and the mounting member is rotatable relative to the connecting member about a second axis. The first axis and the second axis extend in different directions. The head mechanism further includes two first actuating mechanisms fixed to the base, and the two first actuating mechanisms are configured to drive the mounting member to rotate with respect to the base.

17 Claims, 18 Drawing Sheets

HEAD MECHANISM AND ROBOT

CROSS REFERENCE TO RELATED APPLICATIONS

This application claims priority to Chinese Patent Application No. 201922490424.1, filed Dec. 30, 2019, which is hereby incorporated by reference herein as if set forth in its entirety.

BACKGROUND

1. Technical Field

The present disclosure generally relates to robots, and particularly to a head mechanism and a robot having the same.

2. Description of Related Art

In the field of humanoid robots, there have been proposed and developed serial neck mechanisms and parallel neck mechanisms for heads of the humanoid robots. Some problems with conventional robot heads including serial neck mechanisms are as follows: bulky size, large inertia, large neck length, etc. Movement between several joints in series takes up too much space, and the relative movement between joints may result in difficulty in cable routing. It is thus useful and desirable to provide a head mechanism to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
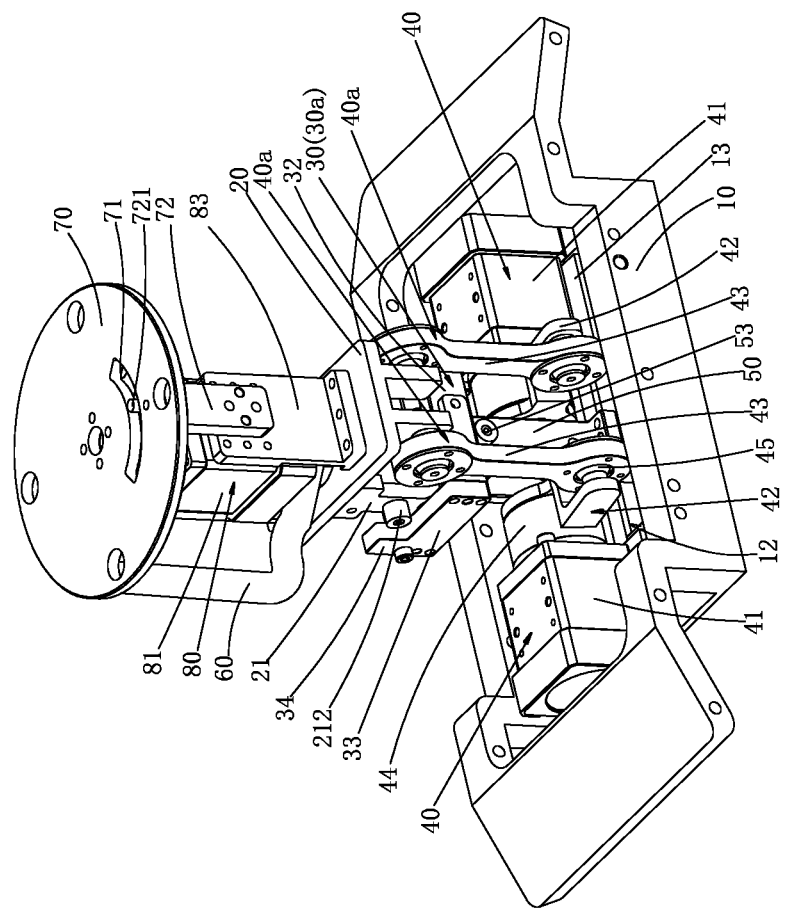
FIG. 1 is an isometric view of a head mechanism according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
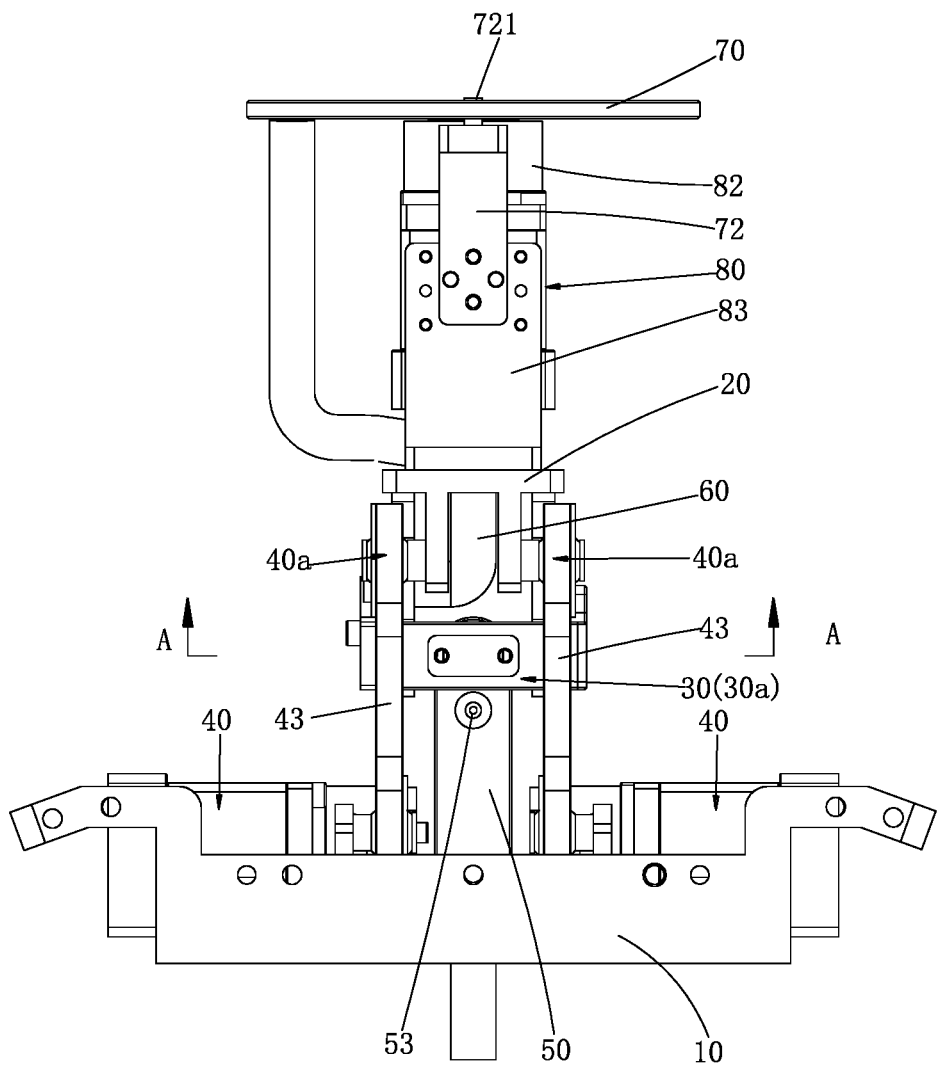
FIG. 2 is a front view of the head mechanism of FIG. 1.

Referring to FIGS. 1 and 2, in one embodiment, a head mechanism is arranged between a body and a head of a robot (e.g., humanoid robot). The head mechanism is configured to allow for forward bending (flexion), backward bending (extension), left bending, and right bending of the head of the robot. The head mechanism includes a base 10, a mounting member 20, a connecting member 30, and two first actuating mechanisms 40. The base 10 is connectable to the body of the robot. The mounting member 20 is arranged above and spaced apart from the base 10. The connecting member 30 is rotatably connected to the base 10 and the mounting member 20. The connecting member 30, together with the mounting member 20, is rotatable relative to the base 10 about a first axis L1 (see FIG. 7). The mounting member 20 is rotatable relative to the connecting member about a second axis (see FIG. 7). The first axis and the second axis extend in different directions. In one embodiment, an angle formed between the first axis and the second axis can be 80 or 90 degrees. It should be noted that the angle formed between the first axis and the second axis may change according to actual needs. The two first actuating mechanisms 40 are fixed to the base 10 and configured to drive the mounting member 20 to rotate with respect to the base 10, about the first axis and the second axis.

Figure 4:
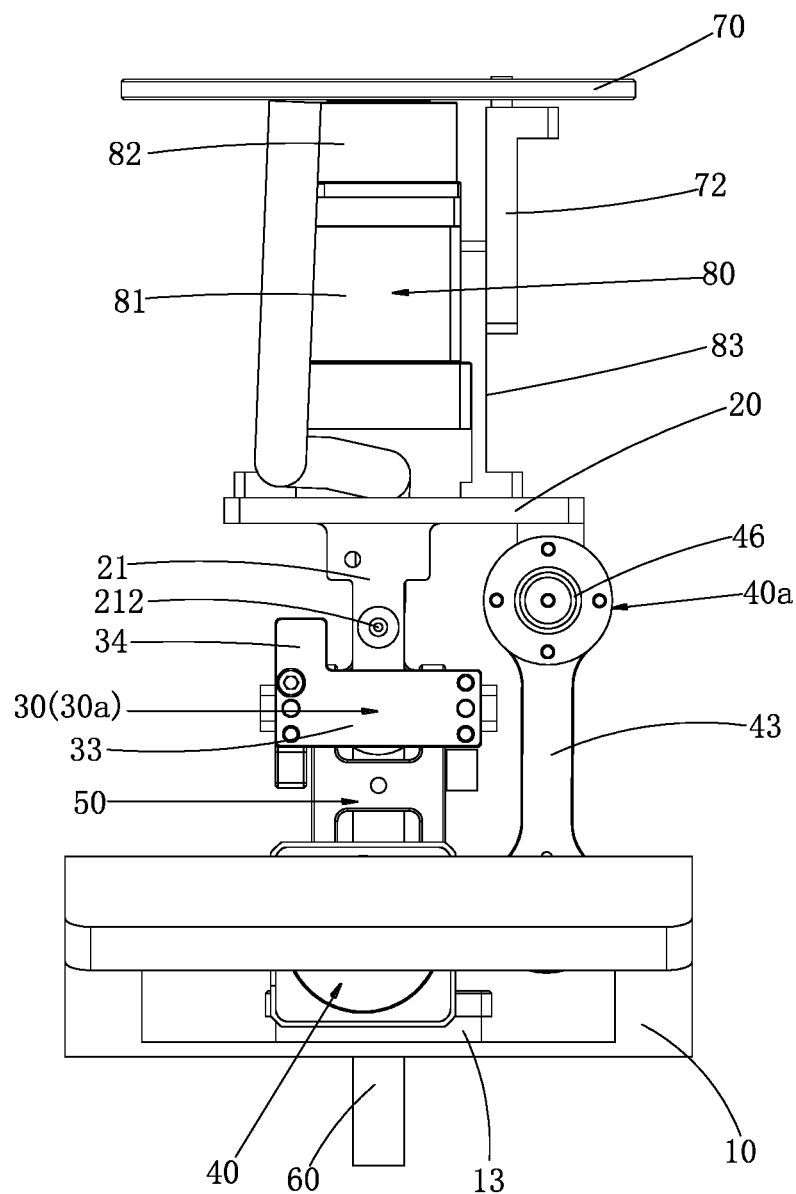
FIG. 4 is a left side view of the head mechanism of FIG. 1.
Figure 8:
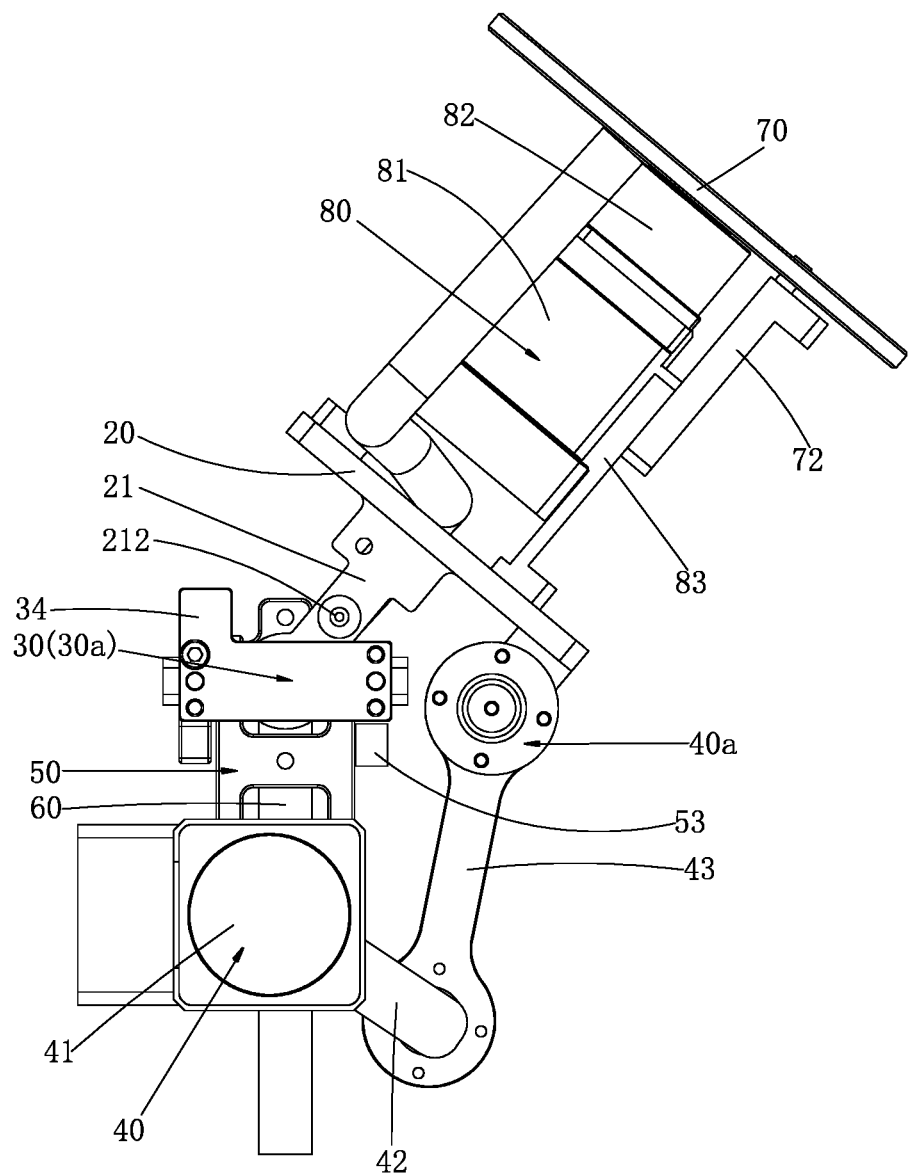
FIG. 8 shows that a mounting member of the head mechanism has rotated forward from the position shown in FIG. 1.
Figure 9:
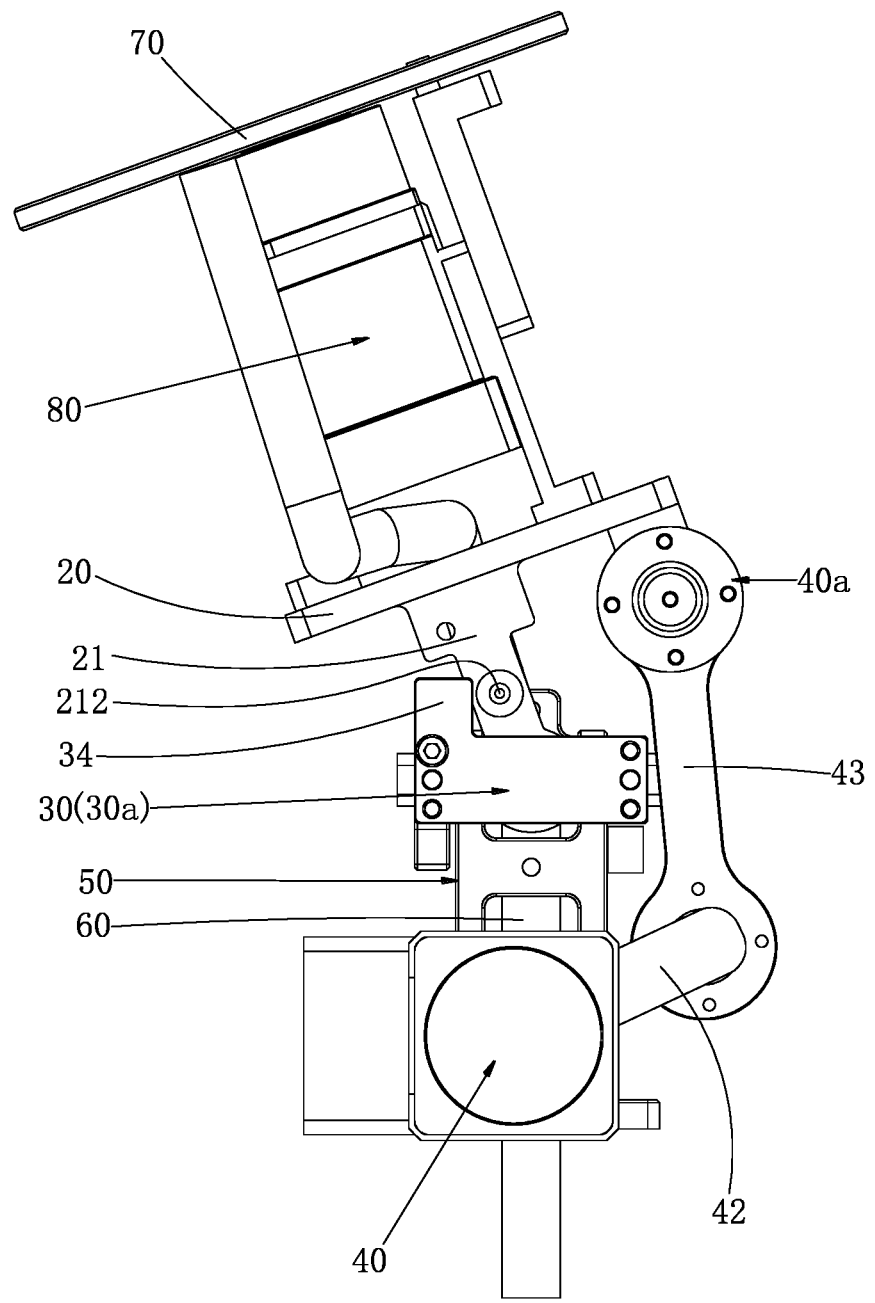
FIG. 9 shows that a mounting member of the head mechanism has rotated backward from the position shown in FIG. 1.

In the embodiment, the two first actuating mechanisms 40 are fixed to the base 10, and an output member 40a of each first actuating mechanism 40 is rotatably connected to the mounting member 20. That is, the two first actuating mechanisms 40 are arranged in parallel to drive the mounting member 20 to rotate forward/backward (flexion/extension) and rotate to the left and to the right (lateral bending), which allows the head of the robot to imitate the flexion/extension and lateral bending of a human head. For example, as shown in FIGS. 4, 8 and 9, upper ends of the output members 40a can move upward/downward simultaneously to positions of same height so as to drive the mounting member 20 to rotate forward/backward. As shown in FIGS. 2 and 10-12, upper ends of the output members 40a can move to positions of different height so as to drive the mounting member 20 to rotate to the left or to the right while rotating forward/backward. The head mechanism of the embodiment of the present disclosure uses fewer parts and has a small weight. The first actuating mechanisms 40 that realize the flexion/extension and lateral bending of the head of the robot is disposed on the base 10. The head mechanism has a small inertia such that the neck of the robot will not be too long. The overall structure is compact and takes up less space.

Compared to conventional serial head mechanisms, the head mechanism of the present embodiment is based on two first actuating mechanisms 40 that are arranged in parallel, which is more ergonomic.

Figure 3:
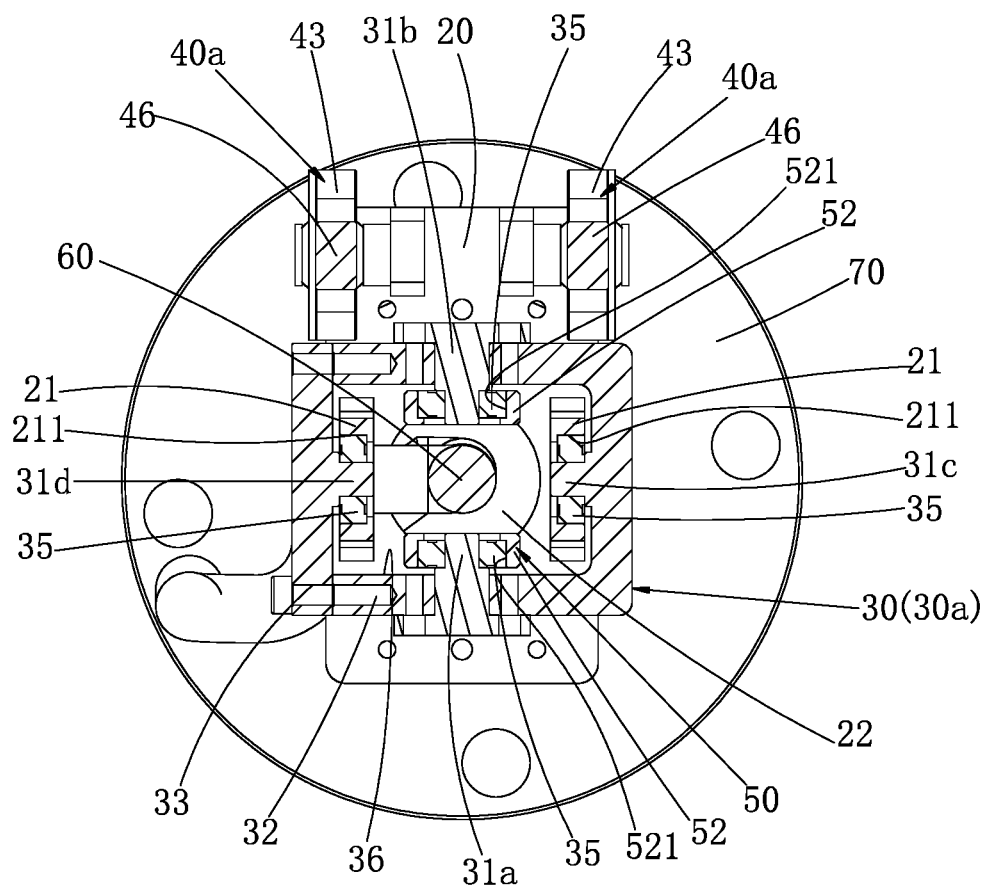
FIG. 3 is a cross-sectional view of the head mechanism, taken along lines A-A of FIG. 2.

Referring to FIGS. 1, 3 and 4, in one embodiment, the output members 40a of the first actuating mechanisms 40 are located at a same side of the second axis, about which the mounting member 20 is rotatable. With such an arrangement, upper ends of the output members 40a can move upward/downward simultaneously to positions of same height so as to drive the mounting member 20 to rotate forward/backward (see FIGS. 4, 8 and 9). Upper ends of the output members 40a can move to positions of different height so as to drive the mounting member 20 to rotate to the left or to the right while rotating forward/backward (see FIGS. 2 and 10-12).

Figure 6:
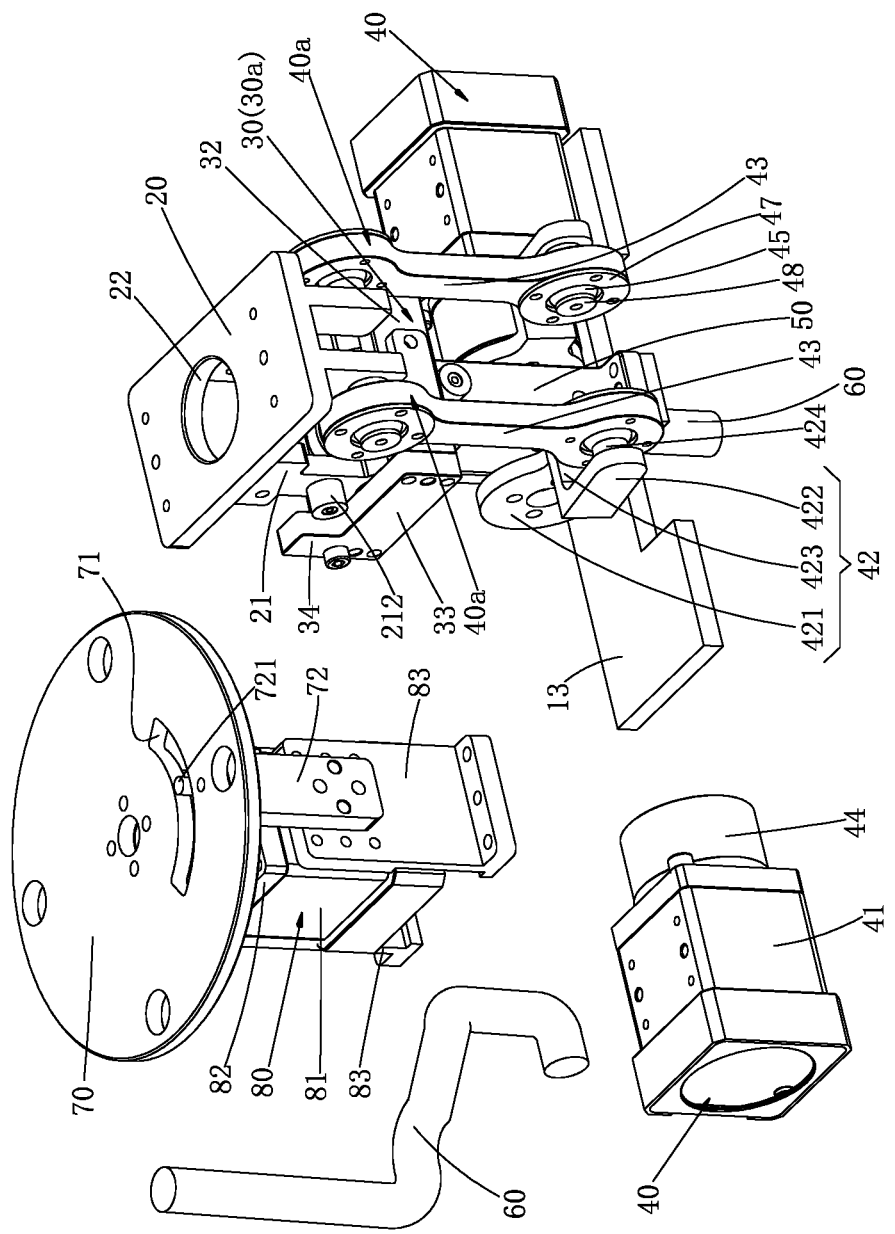
FIG. 6 is an isometric exploded view of the head mechanism of FIG. 1.
Figure 7:
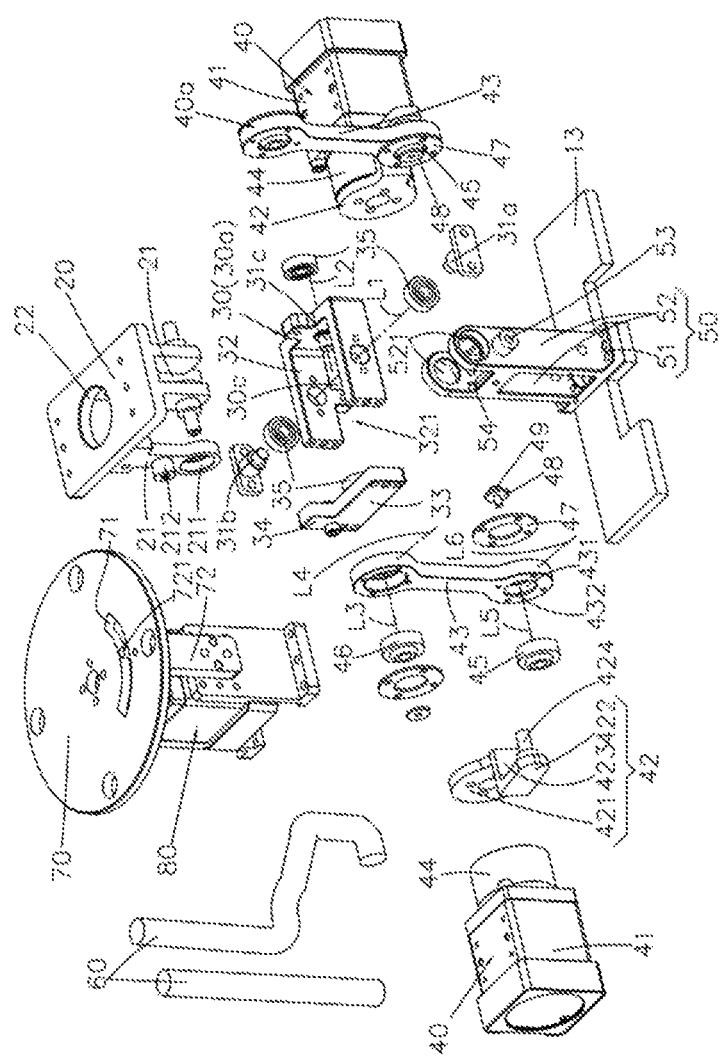
FIG. 7 is an isometric exploded view of the head mechanism of FIG. 1, with more components spreading out.

Referring to FIGS. 1, 6 and 7, in one embodiment, each first actuating mechanism 40 includes a first rotary actuating device 41, a first linkage member 42 that is connected to the first rotary actuating device 41 and configured to rotate when the first rotary actuating device 41 is in operation, a second linkage member 43 having two opposite ends that are rotatably connected to the first linkage member 42 and the mounting member 20. The second linkage member 43 is rotatable with respect to each of the first linkage member 42 and the mounting member 20 about a first axis of rotation (L3/L5, see FIG. 7) and a second axis of rotation (L4/L6, see FIG. 7). In the embodiment, the second linkage members 43 serve as the output member 40a, and the second linkage members 43 are located at a same side of the second axis, about which the mounting member 20 is rotatable. With such an arrangement, the mounting member 20 rotate forward/backward (flexion/extension, see FIGS. 4, 8 and 9), and can rotate to the left or to the right while rotating forward/backward (lateral bending, see FIGS. 2 and 10-12). Specifically, the first rotary actuating devices 41 drive the first linkage members 42 to rotate, and the first linkage members 42 then drives the second linkage members 43 to move up and down. When the upper ends of the second linkage members 43 move simultaneously to positions of same height, the mounting member 20 is driven to rotate forward/backward (see FIGS. 4, 8 and 9). When the upper ends of the second linkage members 43 can move to positions of different height, the mounting member 20 is driven to rotate to the left or to the right while rotating forward/backward (see FIGS. 2 and 10-12). The first rotary actuating devices 41 can be electric motors.

Referring to FIGS. 1 and 2, in one embodiment, the first rotary actuating devices 41 of the two first actuating mechanisms 40 are fixed to the base 10, and output shafts of the first rotary actuating devices 41 extend along a same axis and face each other. As a result, the first linkage members 42 of the two first actuating mechanisms 40 face each other and are spaced apart from each other. Such an arrangement allows the first linkage members 42 and the second linkage members 43 to be arranged between the two first actuating devices 41, thereby making the overall structure compact.

Referring to FIGS. 1, 6 and 7, in one embodiment, a first speed reducer 44 is connected between each first rotary actuating device 41 and the corresponding first linkage member 42. The provision of the first speed reducer 44 can reduce output rotational speed and increase torque to better drive the components connected to the first linkage members 42. The first speed reducers 44 may be harmonic speed reducers, RV speed reducers, planetary speed reducers, or the like.

Referring to FIGS. 1, 6 and 7, in one embodiment, the first linkage member 42 includes a plate 421, a bar 422 spaced apart from the plate 421, and a connecting portion 423 connected to the plate 421 and the bar 422. The plate 421 is connected to the first speed reducer 44, and the bar 422 is connected to the second linkage member 43. In one embodiment, the connecting portion 423 is substantially parallel to the extending direction of the output shaft of the first rotary actuating device 41. The first speed reducer 44 is located in the space defined by the plate 421 and the connecting portion 423. The lower end of the second link 43 is located in the space defined by the connecting portion 423 and the bar 422. Such arrangement can make full use of space and make the structure compact.

Referring to FIGS. 1, 6 and 7, in one embodiment, each first actuating mechanism 40 further includes two spherical plain bearings 45 that are configured to connect the first linkage member 42 to the second linkage member 43, and connect the mounting member 20 to the second linkage member 43. The spherical plain bearings 45 allows each second linkage member 43 to rotate, with respect to the first linkage member 42 and the mounting member 20, about axes that are parallel to the axis about which the output shaft of the first rotary actuating devices 41 rotate. The spherical plain bearings 45 further allows each second linkage member 43 to rotate, with respect to the first linkage member 42 and the mounting member 20, about axes that are substantially orthogonal to the axis about which the output shaft of the first rotary actuating devices 41 rotate. In the embodiment, each second linkage member 43 defines a through hole 431 in its lower end. Each first actuating mechanism 40 further includes a side ring 47 that is connected to the second linkage member 43 and coaxial with the through hole 431. After one spherical plain bearing 45 is received in the through hole 431, the outer ring of the spherical plain bearings 45 is in contact with the inner surface 432 of the through hole 431, and one side surface of the spherical plain bearing 45 is in contact with the side ring 47, which prevents the spherical plain bearing 45 from moving out of the through hole 431. A connecting rod 424 is fixed to one end of the first linkage member 42, and extends in a direction parallel to the axis about which the output shaft of the first rotary actuating device 41 rotates. One end of the connecting rod 424 is inserted into the inner ring of the spherical plain bearing 45. A washer 48 is fixed to one end of the connecting rod 424 by a fastener 49. The washer 48 prevents the connecting rod 424 from disengaging from the inner ring of the spherical plain bearing 45. The second linkage member 43 and the mounting member 20 can be connected to each other in a similar manner.

In an alternative embodiment, each first rotary actuating device 41 can be replaced with a linear actuating device. In this embodiment, the first linkage member 42 and the second linkage member 43 can be omitted, and the output shaft of the linear actuating device serves as the output member 40a. The output shaft of the linear actuating device and the mounting member 20 can be connected to each other in a manner similar to the manner in which the second linkage member 43 is connected to the mounting member 20. The output members 40a of the first actuating mechanisms 40 are located at a same side of the second axis, about which the mounting member 20 is rotatable. The output members 40a are slidable in a vertical direction. Upper ends of the output members 40a can move upward/downward simultaneously to positions of same height so as to drive the mounting member 20 to rotate forward/backward. In addition, upper ends of the output members 40a can move to positions of different height so as to drive the mounting member 20 to rotate to the left or to the right while rotating forward/backward. The linear actuating devices can be electric cylinders.

Referring to FIGS. 3, 6 and 7, in one embodiment, the connecting member 30 includes a main body 30a defining a hollow space 30c, a first pair of shafts 31a and 31b, and a second pair of shafts 31c and 31d. The base 10 includes a support member 50. The main body 30a is rotatably connected to the support member 50 through the first pair of shafts 31a and 31b. The mounting member 20 includes two arms 21 that are spaced apart from each other. The two arms 21 are partly received in the hollow space 30c of the main body 30 and rotatably connected to the main body 30 through the second pair of shafts 31c and 31d. In the embodiment, the first pair of shafts 31a and 31b extends in a direction orthogonal to the direction in which the second pair of shafts 31c and 31d extend. In one embodiment, the main body 30a can be spaced a predetermined distance from the base 10, and the output shafts of the first actuating mechanisms 40 have sufficient length so as to move the output members 40a of the first actuating mechanisms 40 up and down to drive the mounting member 20 to rotate in a predetermined range. As shown in FIGS. 4, 8 and 9, when flexion/extension motion is required, the main body 30a is adjusted to be horizontal, and upper ends of the output members 40a can move upward/downward simultaneously to positions of same height so as to drive the mounting member 20 to rotate forward/backward. As shown in FIGS. 2 and 10-12, when lateral bending is also required, the upper end of the output member 40a of one first actuating mechanism 40 can be controlled to move upward, while the upper end of the output member 40a of the other first actuating mechanism 40 can be controlled to move downward. The main body 30a is then tilted to the left or right while rotating forward/backward. As a result, the mounting member 20 is then moved together with the main body 30a, being tilted to the left or right while rotating forward/backward.

Referring to FIGS. 3 and 7, in one embodiment, the support member 50 includes a base member 51 and two support walls 52 protruding from the base member 51 and spaced apart from each other. The two support walls 52 are arranged in a direction that is substantially orthogonal to the axis about which the output shaft of the first rotary actuating device 41 rotates. The two arms 21 of the mounting member 20 are arranged in a direction that is substantially parallel to the axis about which the output shaft of the first rotary actuating device 41 rotates. The upper ends of the two support walls 52 are received in the hollow space 30c of the connecting member 30, and the lower ends of the two arms 21 are received in the hollow space 30c of the connecting member 30.

Referring to FIGS. 3, 6 and 7, in one embodiment, the second pair of shafts 31c and 31d is fixed to and protrudes from an inner surface of the hollow space 30c of the connecting member 30. Ends of the first pair of shafts 31a and 31b are fixed to the main body 30a of the connecting member 30. In one embodiment, the main body 30a includes a c-shaped member 32 having three walls that are connected to one another and define an opening 321, and a cap 33 that is connected to the c-shaped member 32 and closes the opening 321. The first pair of shafts 31a and 31b are fixed to two opposite walls of the c-shaped member 32. The first pair of shafts 31a and 31b can be integrally formed with the c-shaped member 32, or separately formed and mounted to the c-shaped member 32. One of the second pair of shafts 31c and 31d protrudes from the intermediate wall of the c-shaped member 32, and the other of the second pair of shafts 31c and 31d protrudes from the cap 33. With such arrangement, it is easy to manufacture the c-shaped member 32, the cap 33 and the first pair of shafts 31a and 31b, and easy to assemble them to form the main body 30a.

Referring to FIGS. 1, 8 and 9, in one embodiment, in order to limit the range of motion of the head of the robot during forward/backward rotation, one of the arms 21 includes a first limit stop 212 that is configured to stop motion of the mounting member 20 when the first limit stop 212 comes into contact with the main body 30a. In one embodiment, the main body 30a includes a protrusion 34 protruding from the upper end of the cap 33. As shown in FIG. 9, when the first limit stop 212 comes into contact with the protrusion 34, backward rotation (flexion) of the mounting member 20 is stopped. As shown in FIG. 8, when the first limit stop 212 comes into contact with the upper end of the cap 33, forward rotation (extension) of the mounting member 20 is stopped.

Figure 10:
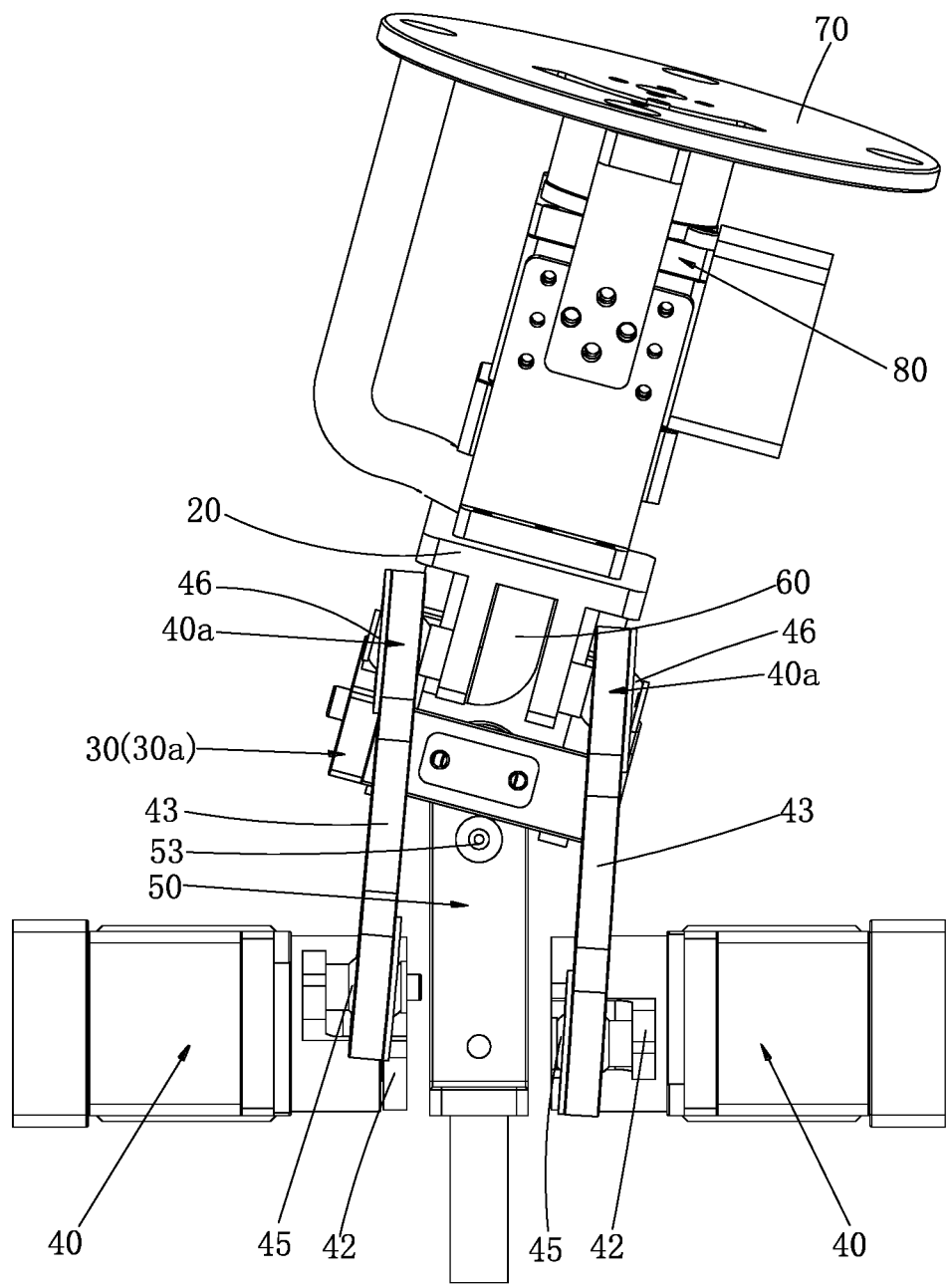
FIG. 10 shows that a mounting member of the head mechanism has tilted to the right.
Figure 11:
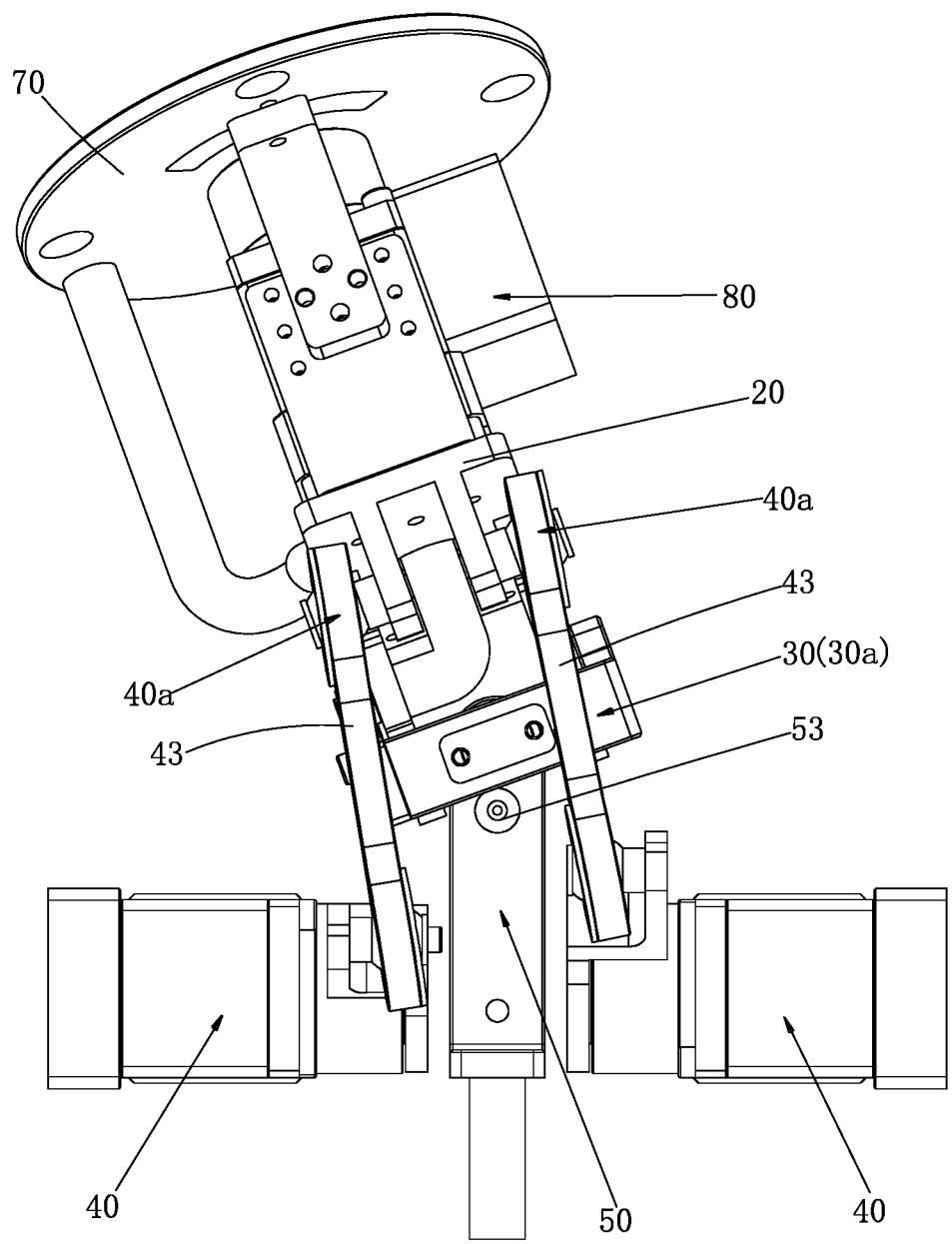
FIG. 11 shows that a mounting member of the head mechanism has tilted to the left.
Figure 12:
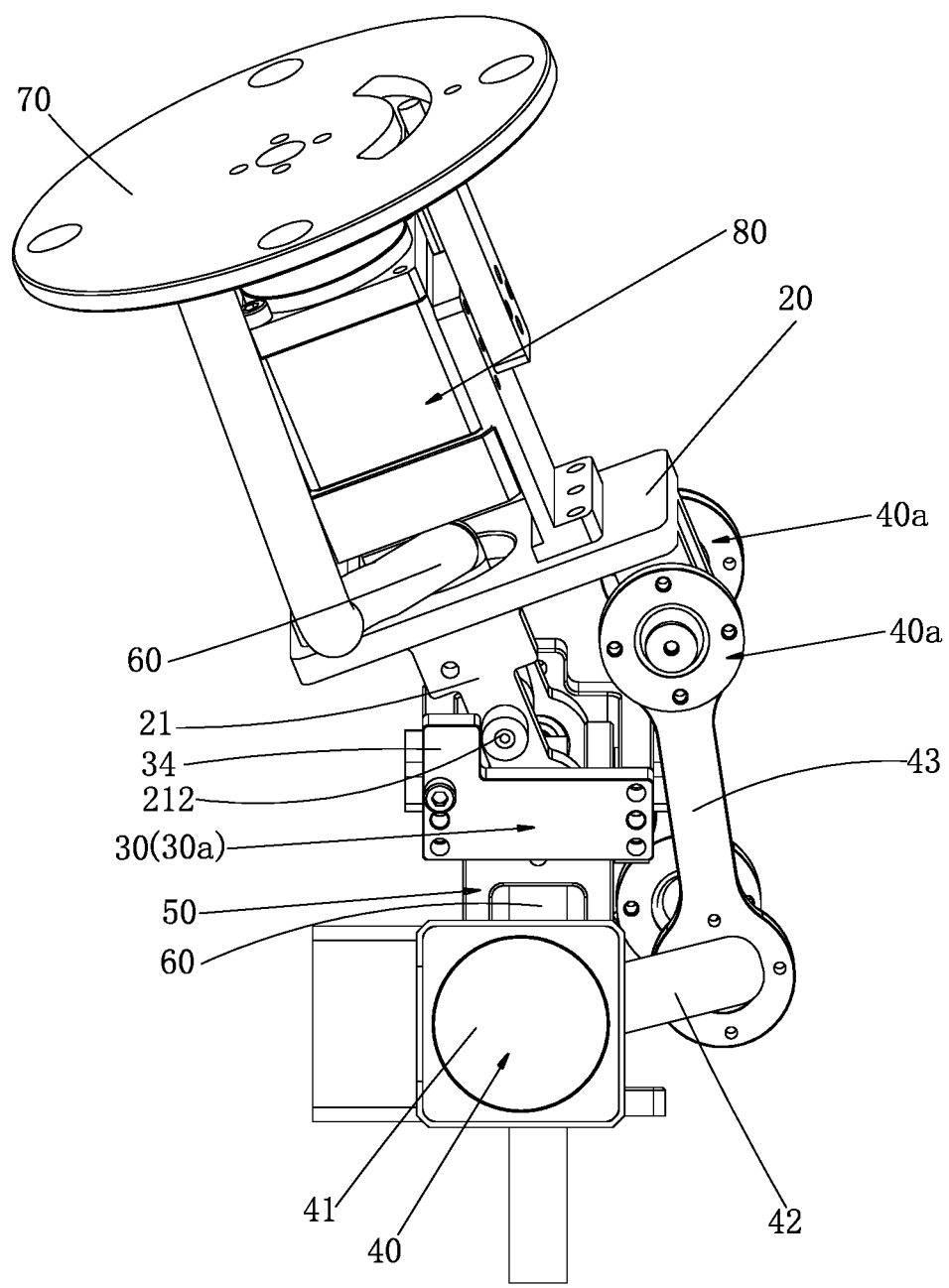
FIG. 12 is a left side view of the head mechanism of FIG. 11.
Figure 13:
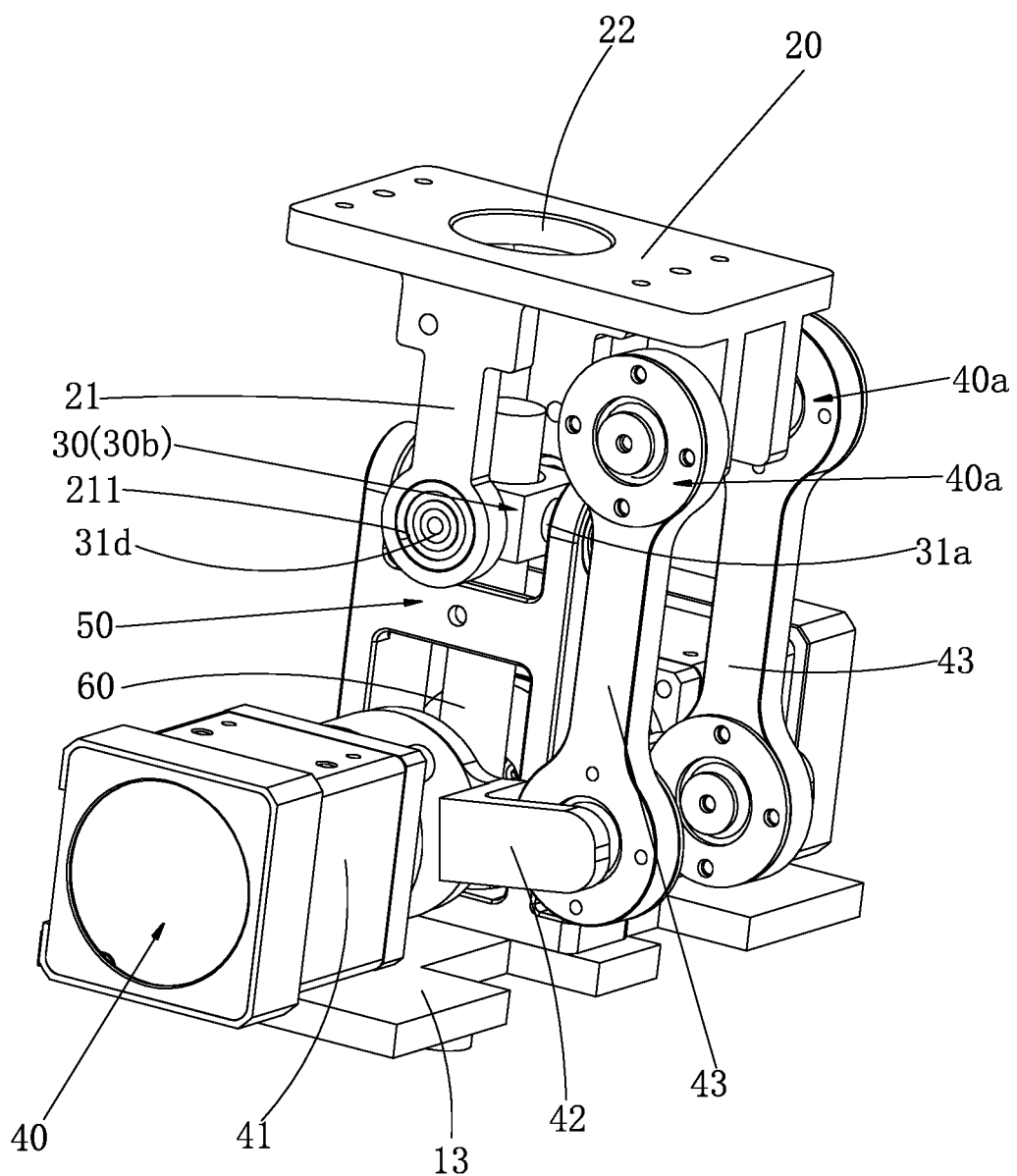
FIG. 13 is an isometric view of a head mechanism according to one embodiment.
Figure 14:
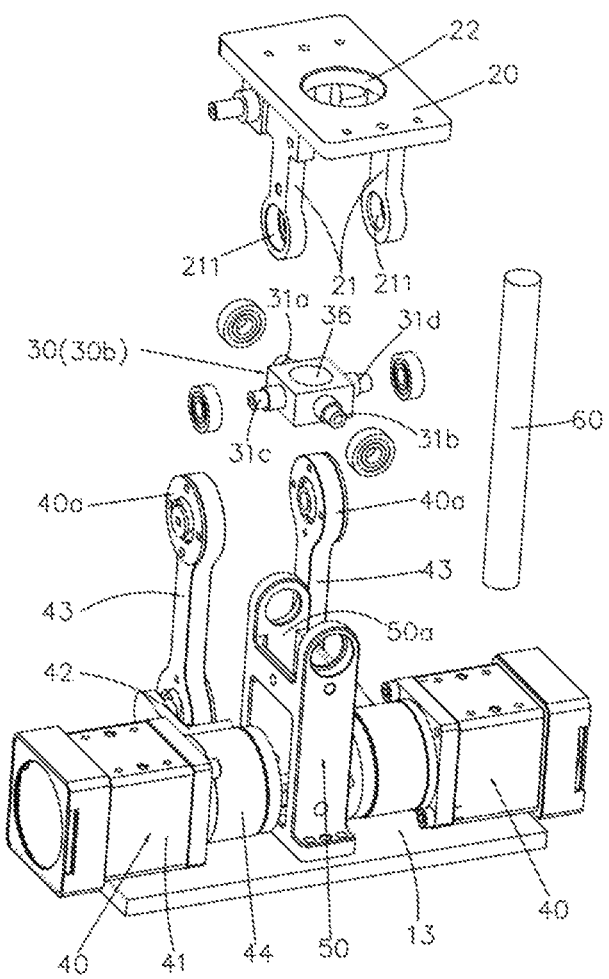
FIG. 14 is an isometric exploded view of the head mechanism of FIG. 13.
Figure 15:
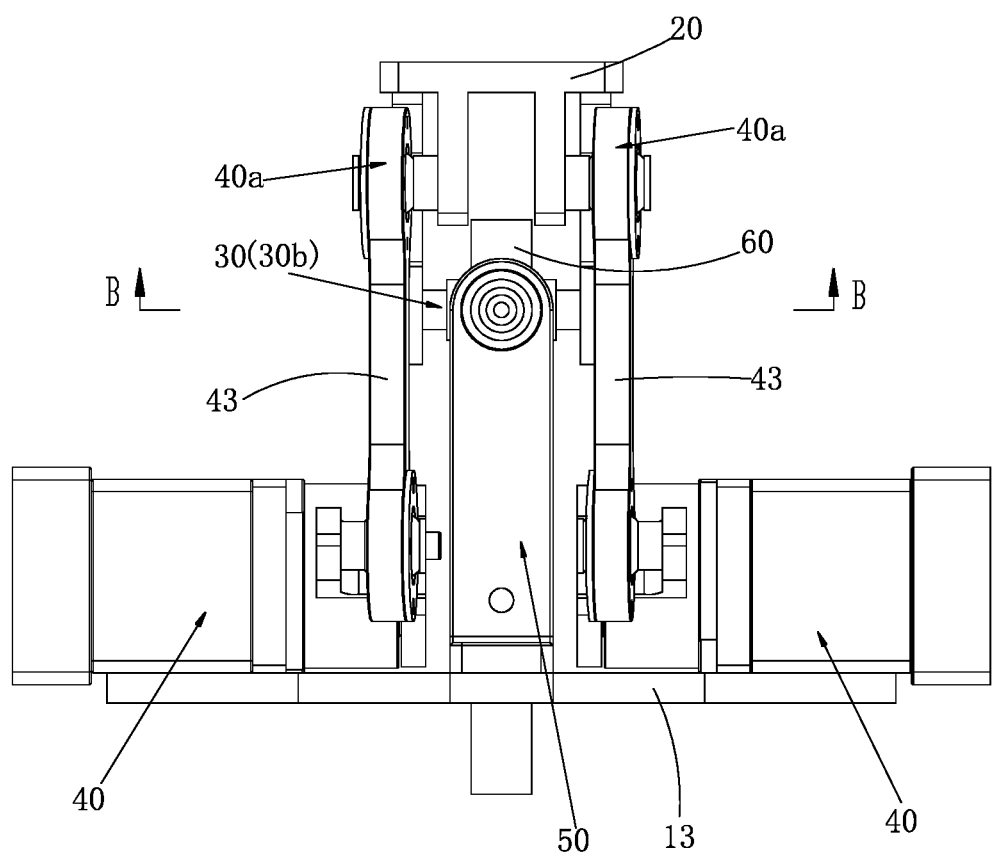
FIG. 15 is a front view of the head mechanism of FIG. 13.
Figure 16:
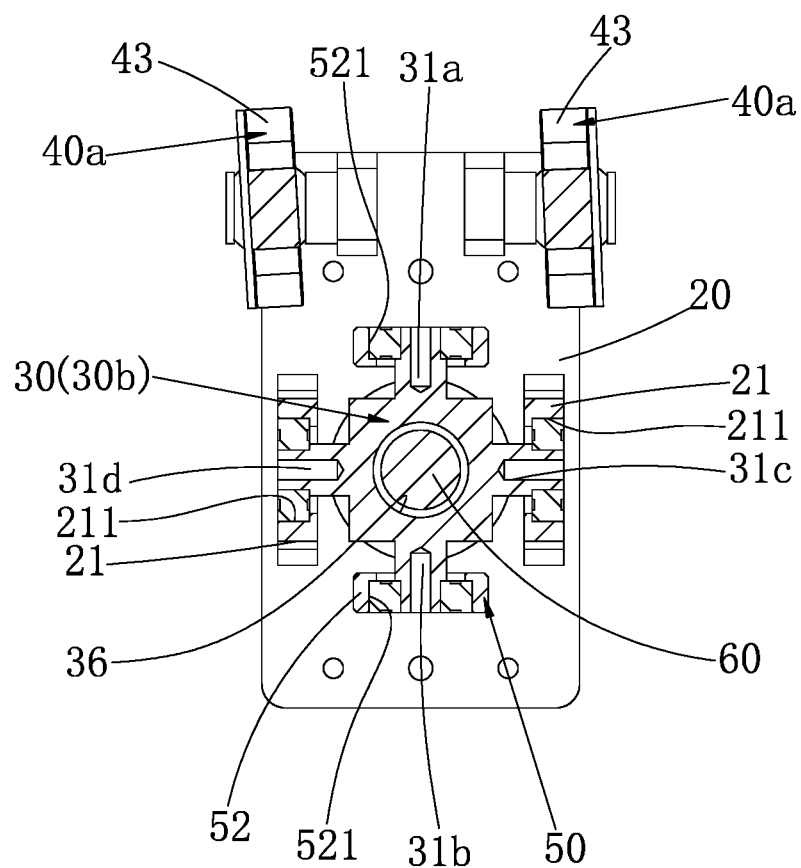
FIG. 16 is a cross-sectional view of the head mechanism of FIG. 13, taken along lines B-B of FIG. 15.
Figure 17:
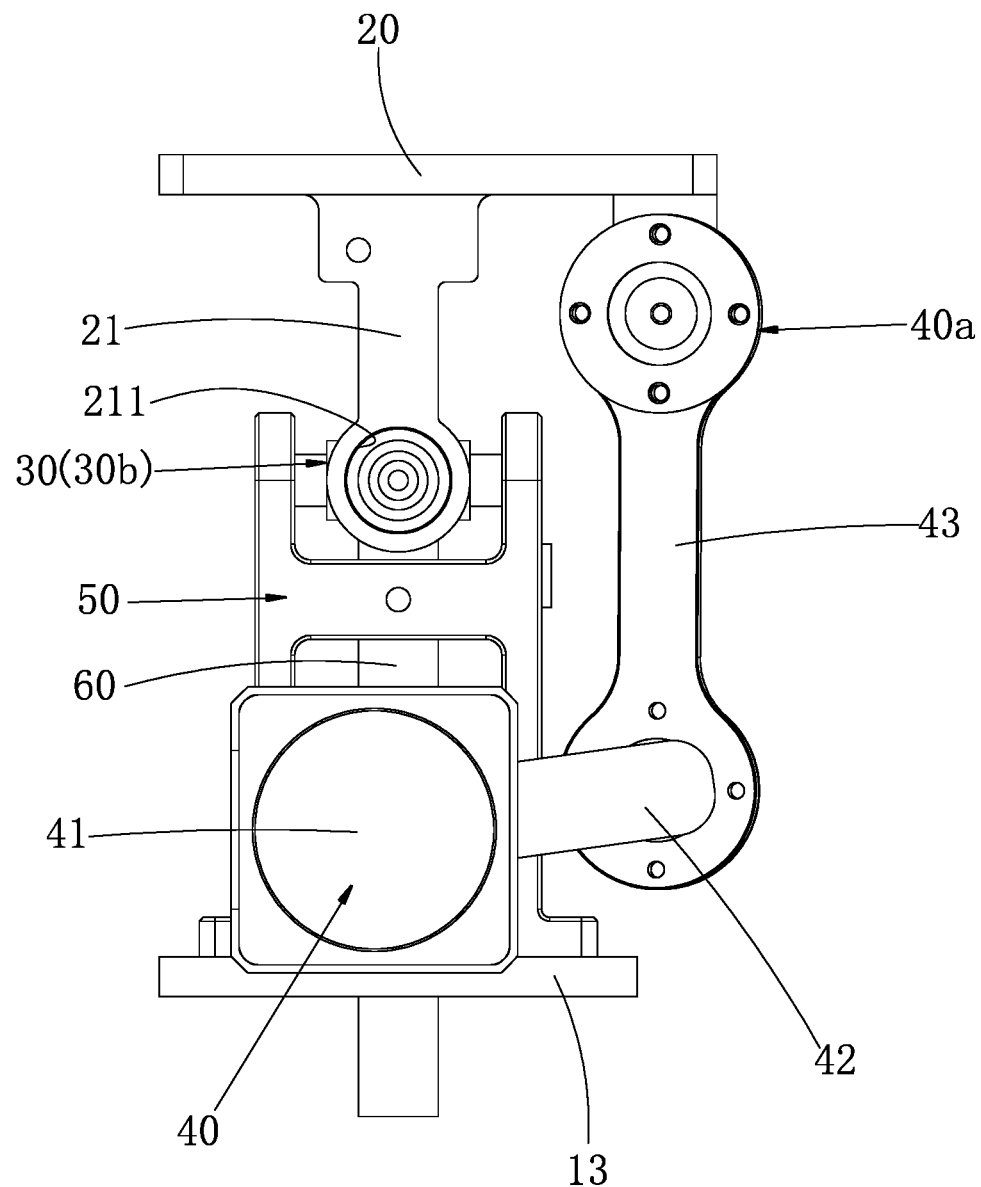
FIG. 17 is a left side view of the head mechanism of FIG. 15.

Referring to FIGS. 10 and 11, in one embodiment, in order to limit the range of motion of the head of the robot during lateral bending, the support member 50 includes a second limit stop 53 that is configured to stop motion of the main body 30a when the second limit stop 53 comes into contact with the main body 30a. The rotation of the mounting member 20 together with the main body 30a to the left or right is thus stopped.

Referring to FIGS. 13-17, in one embodiment, the connecting member 30 may include a main body 30b, a first pair of shafts 31a and 31b and a second pair of shafts 31c and 31d that protrude from a lateral surface of the main body 30b. The shafts 31a and 31b are coaxial, and the shafts 31c and 31d are coaxial. The shafts 31a and 31b extend in a direction that is orthogonal to the direction in which the shafts 31c and 31d extend. The support member 50 defines a chamber 50a in its upper end. The main body 30b is received in the chamber 50a and rotatably connected to the support member 50 through the first pair of shafts 31a and 31b. The main body 30b is arranged between the two arms 21 of the mounting member 20 and rotatably connected to the arms 21 through the second pair of shafts 31c and 31d. In one embodiment, the main body 30b can be spaced a predetermined distance from the base 10, and the output shafts of the first actuating mechanisms 40 have sufficient length so as to move the output members 40a of the first actuating mechanisms 40 up and down to drive the mounting member 20 to rotate in a predetermined range. When flexion/extension motion is required, the main body 30b is adjusted to be horizontal, and upper ends of the output members 40a can move upward/downward simultaneously to positions of same height so as to drive the mounting member 20 to rotate forward/backward. When lateral bending is also required, the upper end of the output member 40a of one first actuating mechanism 40 can be controlled to move upward, while the upper end of the output member 40a of the other first actuating mechanism 40 can be controlled to move downward. The main body 30b is then tilted to the left or right while rotating forward/backward. As a result, the mounting member 20 is then moved together with the main body 30b, being tilted to the left or right while rotating forward/backward.

Referring to FIGS. 3, 7, 14 and 16, in one embodiment, the first pair of shafts 31a and 31b is rotatably connected to the support member 50 through two bearings 35, and the second pair of shafts 31c and 31d is rotatably connected to the arms 21 through two bearings 35. In the embodiment, the two support walls 52 of the support member 50 each define a through hole 521 to receive one bearing 35. Each of the arms 21 of the mounting member 20 defines a through hole 211 to receive one bearing 35.

Referring to FIGS. 3, 5, 6 and 14, in one embodiment, the base 10, the support member 50, the connecting member 30, and the mounting member 20 define passages 11, 54, 36 and 22, respectively, that allow cables 60 to pass therethrough. Such configuration facilitates the arrangement of the cables 60, and solves the problem of difficult cable routing in conventional head mechanisms and solves the problem that cables tend to be worn out during the movement of the head mechanism. In the embodiment, the passage 54 is defined between the two support walls 52.

Referring to FIGS. 1, 6 and 7, in one embodiment, the head mechanism further includes a head supporting member 70 and a second actuating mechanism 80. The second actuating mechanism 80 is arranged on the mounting member 20, and arranged between the head supporting member 70 and the mounting member 20. The second actuating mechanism 80 is configured to actuate rotational movement of the head supporting member 70 about a vertical axis. The head of the robot that is fixed to the head supporting member 70 can thus have three rotational degrees of freedom (i.e., flexion/extension, lateral bending, rotation about a vertical axis).

Referring to FIGS. 1, 4, 6 and 7, in one embodiment, the second actuating mechanism 80 includes a second rotary actuating device 81 fixed to the mounting member 20, and a second speed reducer 82 connected between the second rotary actuating device 81 and the head supporting member 70. The second rotary actuating device 81 can be an electric motor. The provision of the second speed reducer 82 can reduce output rotational speed and increase torque to better drive the components connected to the head supporting member 70. The second speed reducers 82 may be harmonic speed reducers, RV speed reducers, planetary speed reducers, or the like. Two walls 83 are fixed on the top of the mounting member 20, and the second rotary actuating device 81 is arranged between the two walls 83.

Referring to FIGS. 1 and 7, in one embodiment, the head supporting member 70 defines an arc-shaped slot 71, and the mounting member 20 includes a limit stop 72 that passes through the arc-shaped slot 71, and configured to stop motion of the head supporting member 70 when the limit stop 72 comes into contact with one of two ends of the arc-shaped slot 71. In the embodiment, the limit stop 72 has a cylindrical end 721 movably received in the arc-shaped slot 71. The limit stop 72 is fixed to one of the walls 83.

Figure 5:
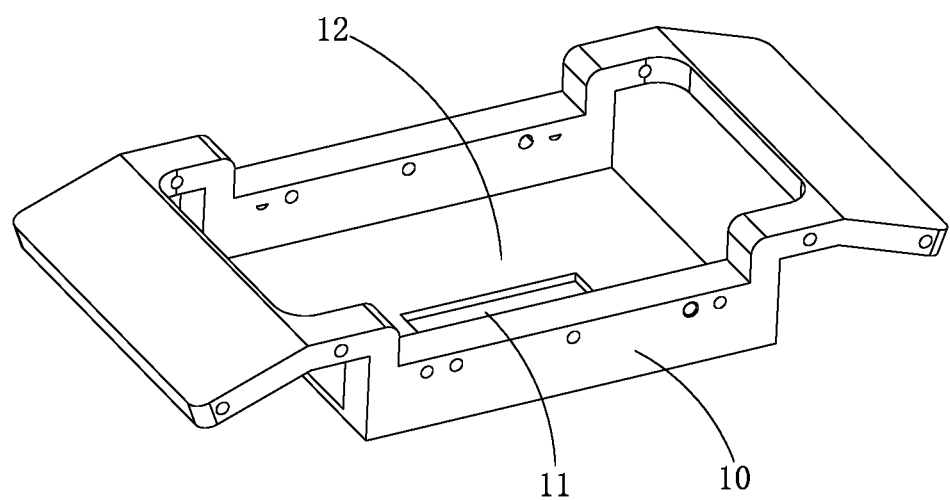
FIG. 5 is an isometric view of a base of the head mechanism of FIG. 1.

Referring to FIGS. 1, 5 and 6, in one embodiment, the base 10 defines a receiving chamber 12, and the first actuating mechanisms 40 are partly received in the receiving chamber 12 and fixed to a support 13 fixed to the bottom of the receiving chamber 12. When assembling the head to the body of the robot, the first actuating mechanisms 40 that actuate the flexion/extension and lateral bending of the head is mounted to the body of the robot, together with the base 10. The head mechanism has a small inertia such that the neck of the robot will not be too long. The passage 11 of the base 10 provides a space for lower ends of the second linkage members 43 to move up and down, and avoids interference of the second linkage members 43 with the base 10.

Figure 18:
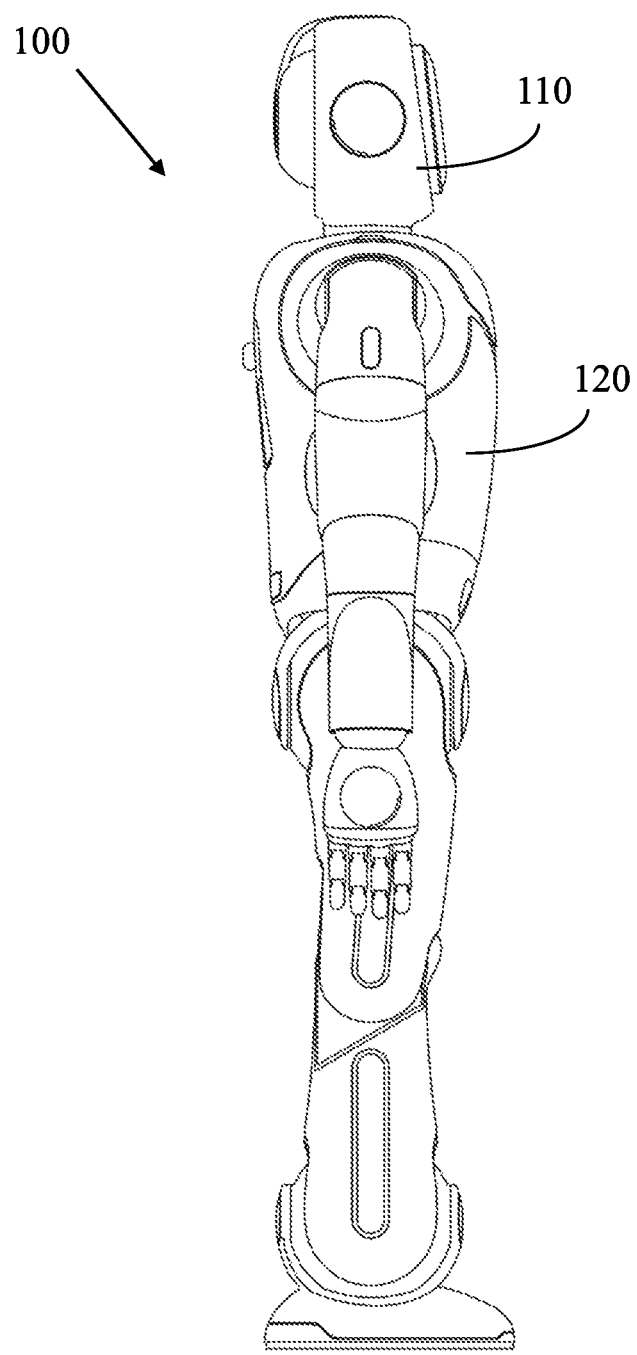
FIG. 18 is a left side view a robot according to one embodiment.

Referring to FIGS. 1, 2 and 18, a robot 100 according to one embodiment of the present disclosure includes the head mechanism as described in the embodiments above. The head mechanism is configured to connect a head 110 to the body 120, and configured to allow for forward bending (flexion), backward bending (extension), left bending, and right bending of the head 110 relative to the body 120.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A head mechanism comprising:
a base connectable to a body of a robot;
a mounting member arranged above the base;
a connecting member rotatably connected to the base and the mounting member, the connecting member, together with the mounting member, rotatable relative to the base about a first axis, the mounting member rotatable relative to the connecting member about a second axis, wherein the first axis and the second axis extend in different directions; and
two first actuating mechanisms fixed to the base, the two first actuating mechanisms configured to drive the mounting member to rotate with respect to the base;
wherein the connecting member comprises a main body defining a hollow space, a first pair of shafts, and a second pair of shafts, the base comprises a support member, the main body is rotatably connected to the support member through the first pair of shafts, the mounting member comprises two arms that are spaced apart from each other, the two arms are partly received in the hollow space of the main body and rotatably connected to the main body through the second pair of shafts;
wherein one of the arms comprises a first limit stop that is configured to stop motion of the mounting member when the first limit stop comes into contact with the main body, the support member comprises a second limit stop that is configured to stop motion of the main body when the second limit stop comes into contact with the main body.

2. The head mechanism of claim 1, wherein each first actuating mechanism comprises a first rotary actuating device, a first linkage member that is connected to the first rotary actuating device and configured to rotate when the first rotary actuating device is in operation, a second linkage member having two opposite ends that are rotatably connected to the first linkage member and the mounting member, the second linkage member is rotatable with respect to each of the first linkage member and the mounting member about a first axis of rotation and a second axis of rotation, and the second linkage members of the two first actuating mechanisms are located at a same side of the second axis.

3. The head mechanism of claim 2, wherein the first rotary actuating devices of the two first actuating mechanisms are fixed to the base, and the first linkage members of the two first actuating mechanisms face each other and are spaced apart from each other.

4. The head mechanism of claim 2, further comprising a first speed reducer connected between the first rotary actuating device and the first linkage member of each first actuating mechanism.

5. The head mechanism of claim 4, wherein the first linkage member comprises a plate, a bar spaced apart from the plate, and a connecting portion connected to the plate and the bar, the plate is connected to the first speed reducer, the bar is connected to the second linkage member.

6. The head mechanism of claim 2, wherein each first actuating mechanism further comprises two spherical plain bearings that are configured to connect the first linkage member to the second linkage member, and connect the mounting member to the second linkage member.

7. The head mechanism of claim 1, wherein the second pair of shafts are fixed to and protrudes from an inner surface of the hollow space, ends of the first pair of shafts are fixed to the main body.

8. The head mechanism of claim 1, wherein the connecting member comprises a main body, a first pair of shafts and a second pair of shafts that protrude from a lateral surface of the main body, the first pair of shafts extend along in a direction that is orthogonal to a direction in which the second pair of shafts extends, the base comprises a support member defining a chamber, the main body is received in the chamber and rotatably connected to the support member through the first pair of shafts, the mounting member comprises two arms that are spaced apart from each other, the main body is arranged between the two arms and rotatably connected to the arms through the second pair of shafts.

9. The head mechanism of claim 8, wherein the first pair of shafts is rotatably connected to the support member through two bearings, and the second pair of shafts is rotatably connected to the arms through two bearings.

10. The head mechanism of claim 8, wherein each of the support member, the connecting member, and the mounting member defines a passage that allows cables to pass therethrough.

11. The head mechanism of claim 8, further comprising a head supporting member and a second actuating mechanism, wherein the second actuating mechanism is arranged on the mounting member, and arranged between the head supporting member and the mounting member, the second actuating mechanism is configured to actuate rotational movement of the head supporting member.

12. The head mechanism of claim 11, wherein the second actuating mechanism comprises a second rotary actuating device fixed to the mounting member, and a second speed reducer connected between the second rotary actuating device and the head supporting member.

13. The head mechanism of claim 11, wherein the head supporting member defines an arc-shaped slot, and the mounting member comprises a limit stop that passes through the arc-shaped slot, and configured to stop motion of the head supporting member when the limit stop comes into contact with one of two ends of the arc-shaped slot.

14. The head mechanism of claim 1, wherein the base defines a receiving chamber, and the first actuating mechanisms are partly received in the receiving chamber.

15. A robot comprising a head mechanism, the head mechanism comprising:
a base connectable to a body of a robot;
a mounting member arranged above the base;
a connecting member rotatably connected to the base and the mounting member, the connecting member, together with the mounting member, rotatable relative to the base about a first axis, the mounting member rotatable relative to the connecting member about a second axis, wherein the first axis and the second axis extend in different directions; and
two first actuating mechanisms fixed to the base, the two first actuating mechanisms configured to drive the mounting member to rotate with respect to the base;
wherein the connecting member comprises a main body defining a hollow space, a first pair of shafts, and a second pair of shafts, the base comprises a support member, the main body is rotatably connected to the support member through the first pair of shafts, the mounting member comprises two arms that are spaced apart from each other, the two arms are partly received in the hollow space of the main body and rotatably connected to the main body through the second pair of shafts;
wherein one of the arms comprises a first limit stop that is configured to stop motion of the mounting member when the first limit stop comes into contact with the main body, the support member comprises a second limit stop that is configured to stop motion of the main body when the second limit stop comes into contact with the main body.

16. A humanoid robot comprising:
a head;
a body;
a head mechanism configured to connect the head to the body, the head mechanism comprising:
a base fixed to the body;
a mounting member arranged above the base;
a connecting member configured to connect the mounting member to the base, the connecting member, together with the mounting member, rotatable relative to the base about a first axis, the mounting member rotatable relative to the connecting member about a second axis, wherein the first axis and the second axis extend in different directions; and
two first actuating mechanisms fixed to the base, the two first actuating mechanisms configured to actuate rotational movement of the mounting member about the first axis and the second axis;
wherein the connecting member comprises a main body defining a hollow space, a first pair of shafts, and a second pair of shafts, the base comprises a support member, the main body is rotatably connected to the support member through the first pair of shafts, the mounting member comprises two arms that are spaced apart from each other, the two arms are partly received in the hollow space of the main body and rotatably connected to the main body through the second pair of shafts;
wherein one of the arms comprises a first limit stop that is configured to stop motion of the mounting member when the first limit stop comes into contact with the main body, the support member comprises a second limit stop that is configured to stop motion of the main body when the second limit stop comes into contact with the main body.

17. The humanoid robot of claim 16, wherein each first actuating mechanism comprises a first rotary actuating device, a first linkage member that is connected to the first rotary actuating device and configured to rotate when the first rotary actuating device is in operation, a second linkage member having two opposite ends that are rotatably connected to the first linkage member and the mounting member, the second linkage member is rotatable with respect to each of the first linkage member and the mounting member about a first axis of rotation and a second axis of rotation, and the second linkage members of the two first actuating mechanisms are located at a same side of the second axis.

\* \* \* \* \*